United States Patent
Pries et al.

(10) Patent No.: US 11,760,527 B2
(45) Date of Patent: *Sep. 19, 2023

(54) LABEL APPLICATOR

(71) Applicant: Bizerba SE & Co. KG, Balingen (DE)

(72) Inventors: Markus Pries, Sigmaringen (DE); Konstantin Rempel, Quakenbrueck (DE); Winai Namsuk, Gaertringen (DE); Christian Schelle, Bingen (DE); Jonas Lauer, Albstadt-Ebingen (DE)

(73) Assignee: BIZERBA SE & CO. KG, Balingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,472

(22) Filed: Dec. 6, 2022

(65) Prior Publication Data

US 2023/0100933 A1 Mar. 30, 2023

Related U.S. Application Data

(63) Continuation of application No. 17/520,729, filed on Nov. 8, 2021, now Pat. No. 11,535,414.

(30) Foreign Application Priority Data

Nov. 27, 2020 (EP) .................................. 20 210 355

(51) Int. Cl.
*B32B 41/00* (2006.01)
*B65C 9/36* (2006.01)
*B65C 9/40* (2006.01)

(52) U.S. Cl.
CPC . *B65C 9/36* (2013.01); *B65C 9/40* (2013.01)

(58) Field of Classification Search
CPC .. B65C 9/36; B65C 9/40; B25J 9/0051; B25J 13/088; B25J 15/0641; B25J 17/0275; B25J 19/0016; B25J 19/0025; B25J 9/0012

(Continued)

(56) References Cited

U.S. PATENT DOCUMENTS

| | | | |
|---|---|---|---|
| 11,535,414 B2 * | 12/2022 | Pries | B25J 19/0025 |
| 2006/0048898 A1 * | 3/2006 | Christie | B65C 9/40 |
| | | | 156/540 |

(Continued)

FOREIGN PATENT DOCUMENTS

| | | |
|---|---|---|
| CN | 104858867 A | 8/2015 |
| DE | 102015223528 A1 | 6/2017 |

(Continued)

*Primary Examiner* — Michael N Orlando
*Assistant Examiner* — Joshel Rivera
(74) *Attorney, Agent, or Firm* — LEYDIG, VOIT & MAYER LTD.

(57) ABSTRACT

A labeling device includes: a robot having articulated arms with arm sections that are articulated: together, to a robot base, and to a platform of a label pickup device. The pickup device has a base plate and a plunger. The plunger has a fixed portion mounted to the base plate and is not displaceable relative to the base plate in a longitudinal direction, has a portion that is movable in the fixed portion in the longitudinal direction toward the base plate to a retracted position, and has an end configured to pick up a label. A pressure regulator of the plunger breaks a negative pressure in the plunger. The plunger's fixed portion covers an opening of its movable portion in a gas-tight manner by of the when the movable portion in an extended position and which is not covered when in the retracted position.

20 Claims, 14 Drawing Sheets

(58) Field of Classification Search
USPC .................... 156/60, 64, 350, 351, 378, 379
See application file for complete search history.

(56) References Cited

U.S. PATENT DOCUMENTS

| | | | |
|---|---|---|---|
| 2007/0194872 A1* | 8/2007 | Pfister | ..................... H01F 7/066 |
| | | | 335/229 |
| 2013/0174960 A1* | 7/2013 | Goetz | ....................... B65C 9/26 |
| | | | 156/64 |
| 2016/0229066 A1 | 8/2016 | Ilch | |
| 2023/0098073 A1* | 3/2023 | Pries | ..................... B25J 9/0051 |
| | | | 156/64 |
| 2023/0099711 A1* | 3/2023 | Pries | ..................... B25J 13/088 |
| | | | 156/64 |

FOREIGN PATENT DOCUMENTS

| | | |
|---|---|---|
| DE | 102019103794 A1 | 8/2019 |
| EP | 2298510 B1 | 5/2012 |
| EP | 2651769 B1 | 8/2015 |
| JP | H05177572 A | 7/1993 |
| JP | H05293783 A | 11/1993 |
| JP | 2001035862 A | 2/2001 |
| JP | 2004306179 A | 11/2004 |

* cited by examiner

LABEL APPLICATOR

CROSS REFERENCE TO RELATED APPLICATIONS

This application is a continuation of U.S. patent application Ser. No. 17/520,729, filed Nov. 8, 2021, and claims benefit to European Patent Application No. EP 20 210 355.2, filed on Nov. 27, 2020. The above applications are hereby incorporated by reference herein.

FIELD

The invention relates to a labeling device, e.g., for a stretch film packaging machine.

BACKGROUND

EP 2 298 510 B1 describes a labeling device with a delta robot. The delta robot makes it possible to achieve high positioning accuracy using inexpensive low-precision motors.

EP 2 651 769 B1 describes a labeling device having an applicator with articulated arms, which is driven by a stepper motor. A controller controls the phase current of the stepper motor as a function of the current speed of the applicator and the maximum rated current of the stepper motor. This makes it possible to keep the power consumption of the applicator low.

DE 10 2019 103 794 A1 describes a suction pad where a negative pressure is produced between a bottom wall section and a suction object by jetting out gas. A negative pressure breaking hole, which is blocked by a lid section, serves for breaking the negative pressure. A drive section is configured to move the lid section and to thereby open or block the negative pressure breaking hole.

Labeling devices place comparatively high demands on the control and the motors used. The motors must be self-locking in order to prevent the platform of the labeling device from falling down and causing damage or being damaged in the event of a power failure. Alternatively, the labeling device are configured such that exactly one motor is short circuited in the event of a power failure, whereby the platform is moved to a suitable position and damage is prevented. The platform is driven solely by the motors, whereby the motors are comparatively heavily loaded.

Furthermore, it has hitherto always been necessary to use an electric pressure relief valve, resulting in complexity and increased cost. Moreover, this valve generally has to be controlled separately, which also adds complexity. In addition, the point in time when pressure relief is required must be determined by a sensor system.

SUMMARY

In an embodiment, the present disclosure provides a labeling device that is used in a stretch film packaging machine. The labeling device includes: a delta robot having at least two articulated arms, each of the articulated arms having a first arm section and a second arm section, which are articulated to one another, the articulated arms each being articulated at a first end to a robot base and at a second end to a platform of a pickup device movable to pick up a label, and the articulated arms each being pivotable about a respective axis of rotation at the robot base and configured to be driven by a respective motor fixedly mounted to the robot base. The pickup device has a base plate and a plunger for picking up the label. The plunger has a fixed portion that is mounted to the base plate and is not displaceable relative to the base plate in a longitudinal direction of the plunger, and further has a portion that is movable in the fixed portion in the longitudinal direction of the plunger and comprises a front end configured to pick up a label. The plunger includes a mechanical pressure regulator configured to break a negative pressure in the plunger, the negative pressure being for picking up the label. The movable portion of the plunger is displaceable in a direction of a longitudinal axis of the plunger through the fixed portion of the plunger toward the base plate to a retracted position. The movable portion of the plunger has an opening which is covered in a gas-tight manner by the fixed portion of the plunger when the movable portion of the plunger is in an extended position to pick up the label and which is not covered by the fixed portion of the plunger when the movable portion of the plunger is in the retracted position.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
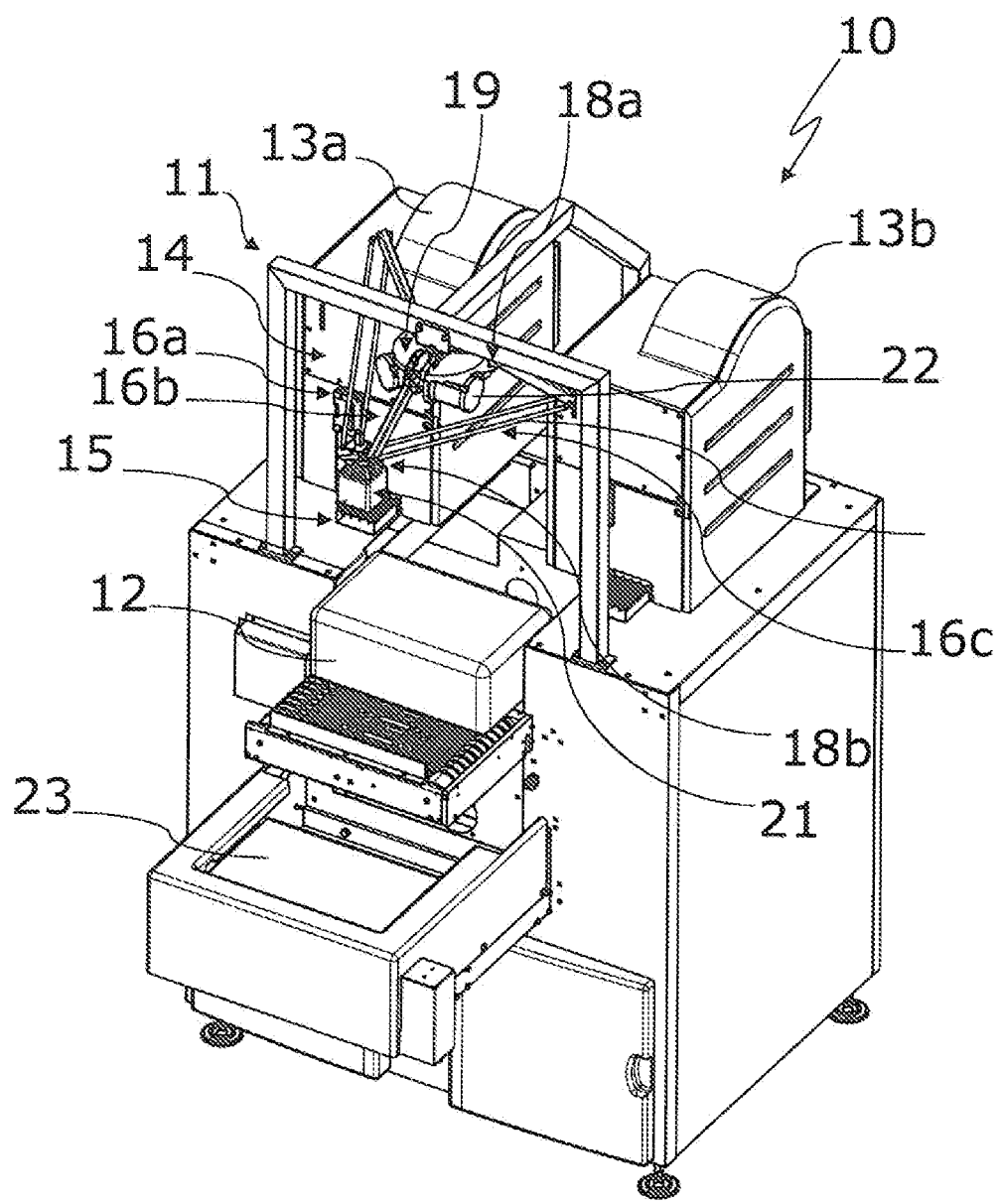
FIG. 1 is an isometric view of a packaging machine with a labeling device according to the invention.

Embodiments of the present invention relate to a labeling device for a stretch film packaging machine. The labeling device may have a delta robot having at least two articulated arms, each having a first and a second arm section, which are articulated to one another, the articulated arms each being articulated at a first end to a robot base and at a second end to a platform of a pickup device movable to pick up a label.

The articulated arms may each be pivotable about a respective axis of rotation at the robot base and driven by a respective motor fixedly mounted to the robot base.

Aspects of the present invention provide a labeling device of the above-defined type, which is significantly simpler and more reliable in construction, especially with respect to the demands placed on the control and the drive mechanism.

Embodiments of the present invention provide a device in a technically particularly simple and surprisingly effective manner by a labeling device of the aforementioned type, which is characterized: in that the pickup device has a base plate and a plunger for picking up the label, in that the plunger includes a fixed portion that is mounted to the base plate and is not displaceable relative to the base plate in the longitudinal direction of the plunger, and further includes a portion that is movable in the fixed portion in the longitudinal direction of the plunger and has a front end for picking up a label, in that the plunger has a mechanical pressure regulator for breaking a negative pressure in the plunger, which negative pressure is used to pick up the label, and in that the movable portion of the plunger is displaceable in the direction of the longitudinal axis of the plunger through the fixed portion of the plunger toward the base plate to a retracted position, the movable portion of the plunger having an opening which is covered in a gas-tight manner by the fixed portion of the plunger when the movable portion of the plunger is in an extended position to pick up the label and which is not covered by the fixed portion of the plunger when the movable portion of the plunger is in the retracted position.

The breaking of the negative air pressure occurs mechanically when the movable portion of the plunger is moved to the retracted position, without the need for electronic control or for an electronic valve. The fixed portion of the plunger can be stably mounted to the base plate. The movable portion of the plunger contacts the fixed portion of the plunger along the longitudinal direction of the plunger, thereby allowing for particularly stable guidance of the movable portion of the plunger.

The plunger in particular extends through the base plate. When the movable portion of the plunger is in the retracted position, the front end of the movable portion of the plunger is located closer to the base plate then when the movable portion of the plunger is in the extended position. In the extended position of the plunger, the fixed portion of the plunger and its movable portion are in gas-tight contact with each other. The idle state of the labeling device refers in particular to the state in which the labeling device is turned off. In the idle state, the pickup device is in particular disposed vertically above a position in which the pickup device is located when it releases a label.

The pickup device is preferably moved by three articulated arms. The respective second arm section is movable relative to the first arm section and is in particular formed of two parallel rods.

A first embodiment of the present invention, which is particularly simple to manufacture, is characterized in that the opening is formed closer to the rear end of the movable portion of the plunger opposite its front end than it is to its front end. In the extended position, the rear end rests against the fixed portion of the plunger, the opening being covered and a negative pressure being produced in the plunger to pick up the label. The negative pressure causes the plunger to suck the label against it. In the retracted position, the rear end and the opening are spaced apart from the fixed portion of the plunger in the direction of the longitudinal axis so that air flows through the opening into the movable portion of the plunger and the negative pressure is relieved to release the label from the plunger. The release of the label occurs when the front end of the plunger strikes a package and the package pushes the front end of the plunger toward the base plate. The relief of the negative pressure in the plunger causes the label to be released therefrom and to be applied to the package. The release of the label is accomplished purely mechanically. The movable portion of the plunger is displaced from the extended position to the retracted position in particular by a package to which the label is being applied.

In further advantageous embodiments, a suction head is mounted to the front end of the movable portion of the plunger and connected via the plunger to a vacuum pump, which is preferably mounted to the base plate. The suction head serves to suck the label against it and thereby retain the label on the plunger. The vacuum pump produces a negative pressure in the suction head. By mounting the vacuum pump to the base plate, the connection between the suction head and the vacuum pump can be made short and thus sturdy. During application of the label to a package, the suction head is pressed onto the package. In particular, the front end of the movable portion of the plunger is at the same time displaced by the package toward the base plate, thereby avoiding damage to the package. An air hose between the plunger and the vacuum pump for withdrawing the air is movable only with the movable portion of the plunger between the retracted position and the extended position. The air hose is not displaceable relative to the movable portion of the plunger in the axial direction. Therefore, here is no need for a complex air path system.

A preferred embodiment of the labeling device is characterized in that the movable portion and/or the fixed portion of the plunger are/is tubular. The plunger is in particular configured to have a cylindrical shape with a length in the direction of its longitudinal axis greater than its width. The movable portion of the plunger is in particular guided in the fixed portion of the plunger, preferably in a telescopic manner. The fixed portion of the plunger contacts the movable portion along the circumference of the movable portion. The movable portion of the plunger is guided in the fixed portion in a particularly stable manner.

In another preferred embodiment, when the movable portion of the plunger is in the unloaded condition, it is retained in the extended position by a spring element. The movable portion of the plunger is transferred from the extended position to the retracted position against the spring force and is retained in the extended position in a stable manner without the action of external forces, or is elastically returned from the retracted position to the extended position. During application of a label to a package, the front end of the movable portion of the plunger is displaced by the package toward the base plate against the spring force so that the package is not damaged. The spring element is disposed in particular between the movable portion of the plunger and the fixed portion of the plunger or the base plate.

In another advantageous embodiment, the labeling device is characterized in that the movable portion and/or the fixed portion of the plunger are/is mounted so as to be rotatable relative to the base plate about the longitudinal axis of the plunger, and preferably movable by a rotary motor. The movable portion and/or the fixed portion of the plunger are/is disposed in particular in a rotary bearing in the base plate. In a preferred variant, the fixed portion is immovably secured to the base plate, and the movable portion is rotatably supported in the fixed portion. The rotatable support of the plunger serves to allow the label sucked onto the front end of the movable portion of the plunger to be aligned during application of the label to a package. For embodiments where the rotary motor for rotating the plunger is disposed on the base plate, a comparatively simple gear mechanism is sufficient to rotate the plunger.

One class of advantageous embodiments is characterized in that a permanent magnet is mounted to the rear end of the movable portion of the plunger opposite the front end of the movable portion of the plunger, the pickup device having a Hall-effect sensor for measuring the magnetic field of the permanent magnet, and the Hall-effect sensor being connected to a control unit for detecting displacement of the movable portion of the plunger. The Hall-effect sensor is used to measure the movement of the permanent magnet via the change in the magnetic field caused by such movement. Consequently, the movement of the rear end of the movable portion of the plunger is measured since the permanent magnet is mounted to the rear end. Thus, it is possible to measure whether the movable portion has moved relative to a package. This is because the package pushes the movable portion in the direction opposite to the movement of the articulated arm during application of the labels, so that the movable portion of the plunger is displaced relative to the fixed portion of the plunger in the direction opposite to the movement of the pickup device or pickup unit during application of the label to the package. The control then stops in particular a movement of the articulated arm toward the package during application of a label or toward the label during pickup of the same from a label printer, preferably in a downward direction. Subsequently, the control moves the articulated arm in the opposite direction to carry the label to the package or to pick up a new label.

In a refinement of the aforementioned embodiments, the Hall-effect sensor and the permanent magnet are located at the same height relative to the base plate when the movable portion of the plunger is in the extended position. Due to the spatial proximity of the permanent magnet and the Hall-effect sensor, the magnetic field generated by the permanent magnet is comparatively strong at the location of the Hall-effect sensor and is readily detectable. When the Hall-effect sensor detects from a change in the magnetic field that the magnet is no longer at the level of the Hall-effect sensor, then the Hall-effect sensor provides a signal to the control unit indicating that the plunger has struck a package. The control then provides the signal to the articulated arm to perform a movement away from the package.

In another class of preferred embodiments, the robot base is connected to the platform by a return element for mechanically returning the pickup device against gravity to its home position in the idle state of the robot. The return element assists the motors in moving the articulated arms back upward to remove the respective articulated arm from the package after the label has been applied to the package. This reduces the load on the motors during movement of the articulated arms against gravity.

Refinements of these embodiments are characterized in that the return element has an elastic tension cord, in particular of rubber or latex. The elastic cord is tensioned when the articulated arms are moved to apply the labels. Such movement takes place in particular downwardly in the direction of gravity, utilizing the pickup device's own weight. The return movement takes place under relaxation of the previously tensioned elastic cord, in particular against gravity, so that the spring force of the tensioned elastic cord assist in the work of the motors. If in the event of a short circuit, the pickup device falls freely, in particular onto a heat-sealing plate for bonding a packaging film of the package, the elastic tension cord counteracts the free fall, so that damage is avoided.

Thus, the return element serves a protective function for the pickup device.

A particularly advantageous embodiment of the aforementioned refinements is characterized in that a power cable for supplying power to the pickup device is arranged on and carried by the tension cord. The power cable is in particular wound thereon. It has in particular the shape of a telephone cord. Thus, the length of the power cable is variably changeable in the direction of the longitudinal axis of the tension cord.

Another class of embodiments of the labeling device is characterized in that each of the second arm sections of the articulated arms has a first and/or a second end with a lug having an in particular circular, outwardly slotted through-receptacle for holding a spherical screw head. The second arm section in particular connects the first arm section to the pickup device. The through-hole of the lug is formed by an inner radius of the lug, which inner radius does not have a cylindrical, but a reciprocal spherical geometry. When a spherical screw head or a screw head is inserted into the lug, the lug is in particular forced apart. Upon insertion, the lug clamps the spherical screw head therein so that it cannot slide out sideways. In particular, the legs of the lug form a retainer on both sides of the slotted through-receptacle, the legs being capable of being forced apart relatively easily. The respective screw is fixed in particular in the pickup device and/or the first arm section. The second arm sections are non-destructively detachable from the first arm section and/or the pickup device, especially in the event of a malfunction of the labeling device.

Refinements of this class of embodiments are characterized in that spherical screw heads are inserted in the lugs at the ends of the first and/or second arm sections to connect the arm sections to one another and/or to the platform and/or to the robot base, the lugs embracing the spherical screw heads frictionally, and possibly also with a form fit. The platform and the robot base are rotatable relative to the first and/or second arm sections in three-dimensional space. This allows for better alignment of the platform and the robot base. In addition, this enables manufacture with slightly looser tolerances.

Preferably, the respective first and/or second arm sections of the articulated arms are/is formed as a carbon rod. As a result, the arm sections are particularly sturdy while at the same time being comparatively light in weight.

Finally, another advantageous embodiment of the invention is characterized in that the ends of the first and/or second arm sections of the articulated arms are at least partially made of plastic material with good slip properties, in particular of base polymers, fibers and fillers as well as solid lubricants, preferably of Iglidur®. This allows for frictionless movement of the articulated arms. The Iglidur® material reduces wear at the ends of the arm sections during operation.

Other features and advantages of the invention will be apparent from the following detailed description of exemplary embodiments of the invention, taken in conjunction with the figures of the drawing, which shows details of the invention. The individual features may be implemented alone or in any combination in variants of the invention.

FIG. 1 shows a stretch film packaging machine 10 having a labeling device 11 for applying a label to an article 12. Labeling device 11 is disposed at two printers 13a, 13b for printing the labels. A delta robot 14 of labeling device 11 serves to convey the label from a dispensing device 15 of printer 13a to article 12. The robot has three articulated arms 16a, 16b, 16c. Articulated arms 16a-16c are each connected at a first end 18a to a robot base 19 and at a second end 18b to a pickup device 21, which, in a pickup position shown in FIG. 1, takes the label from dispensing device 15 of printer 13a. A weighing device 23 of stretch film packaging machine 10 is used for weighing article 12.

Figure 2:
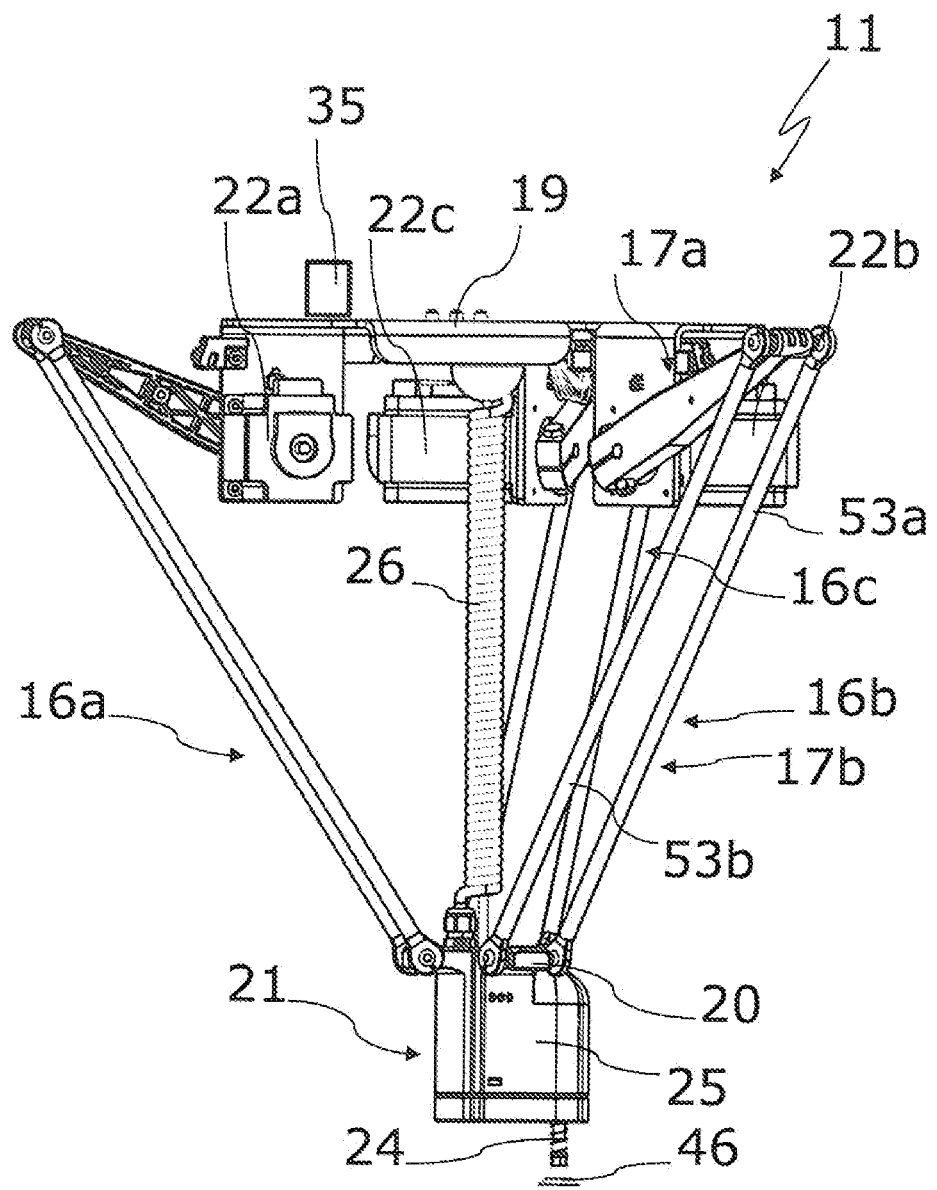
FIG. 2 is a side view of the labeling device according to the invention.

FIG. 2 shows a side view of labeling device 11, including robot base 19, pickup device 21, and the articulated arms 16a-16c connecting them. Articulated arms 16a-16c are attached to a platform 20 of pickup device 21. The articulated arms have first and second arm sections 17a, 17b which are articulated to one another. The second arm section has two rods 53a, 53b arranged in parallel. Articulated arms 16a-16c are each pivotable about a respective axis of rotation at robot base 19 and driven by a respective motor 22a, 22b, 22c fixedly mounted to robot base 19. Pickup device 21 has a plunger 24 for picking up the label, which protrudes downwardly from a protective housing 25 of pickup device 21 in the direction of gravity. A suction head 46 for sucking labels against it is mounted to plunger 24. Robot base 19 is connected to platform 20 by a return element 26 for mechanically returning pickup device 21 against gravity to its home position in the idle state of robot 14. The robot base includes a control unit 35 for controlling robot 14.

Figure 3A:
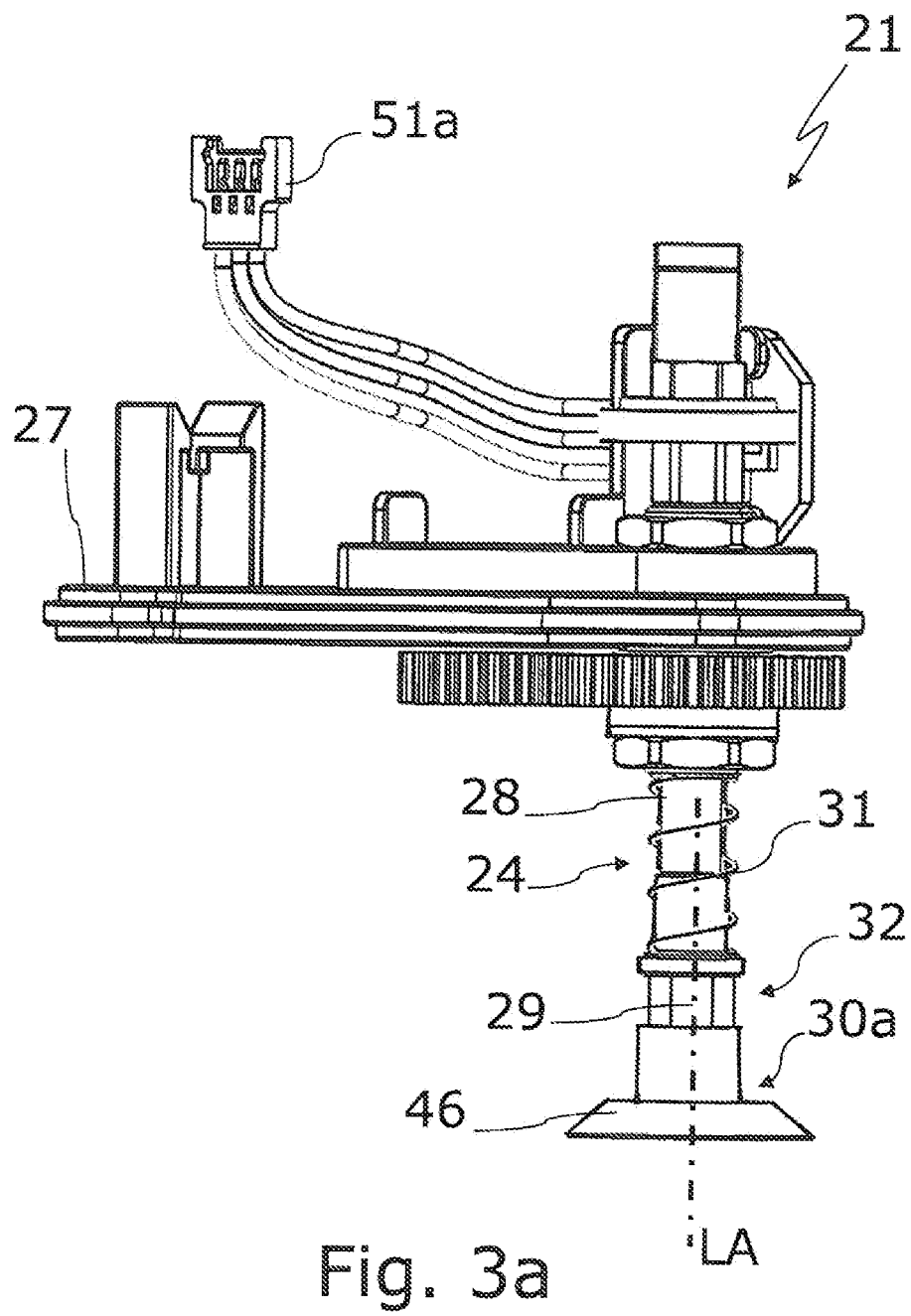
FIG. 3*a* is a first side view of a pickup device of the labeling device with a plunger in the extended position.

FIG. 3a shows a first side view of pickup device 21 without protective housing 25 (see FIG. 2). Plunger 24 includes a fixed portion 28 that is mounted to a base plate 27 and is not displaceable relative to base plate 27 in longitudinal direction LA of plunger 24, and further includes a portion 29 that is movable in fixed portion 28 in longitudinal direction LA of plunger 24 and has a front end 30a to which the suction head 24 for picking up the label is mounted. Plunger 24 protrudes through base plate 27 of pickup device 21. In the unloaded condition, a spring element 31 retains movable portion 29 of plunger 24 in an extended position 32, in which front end 30a of plunger 24 is further away from base plate 27 than in a retracted position 33 (see FIG. 3c) to enable picking up of the label. Bundled connections 51a serve to connect sensors (of pickup device 21 to control unit 35 (see FIG. 2). Movable portion 29 of plunger 24 is displaceable in the direction of longitudinal axis LA of plunger 24 through fixed portion 28 of plunger 24 toward base plate 27 to a retracted position 33. A rotary motor 38 on base plate 27 is used to rotate movable portion 29 of plunger 24 about its longitudinal axis LA.

Figure 3B:
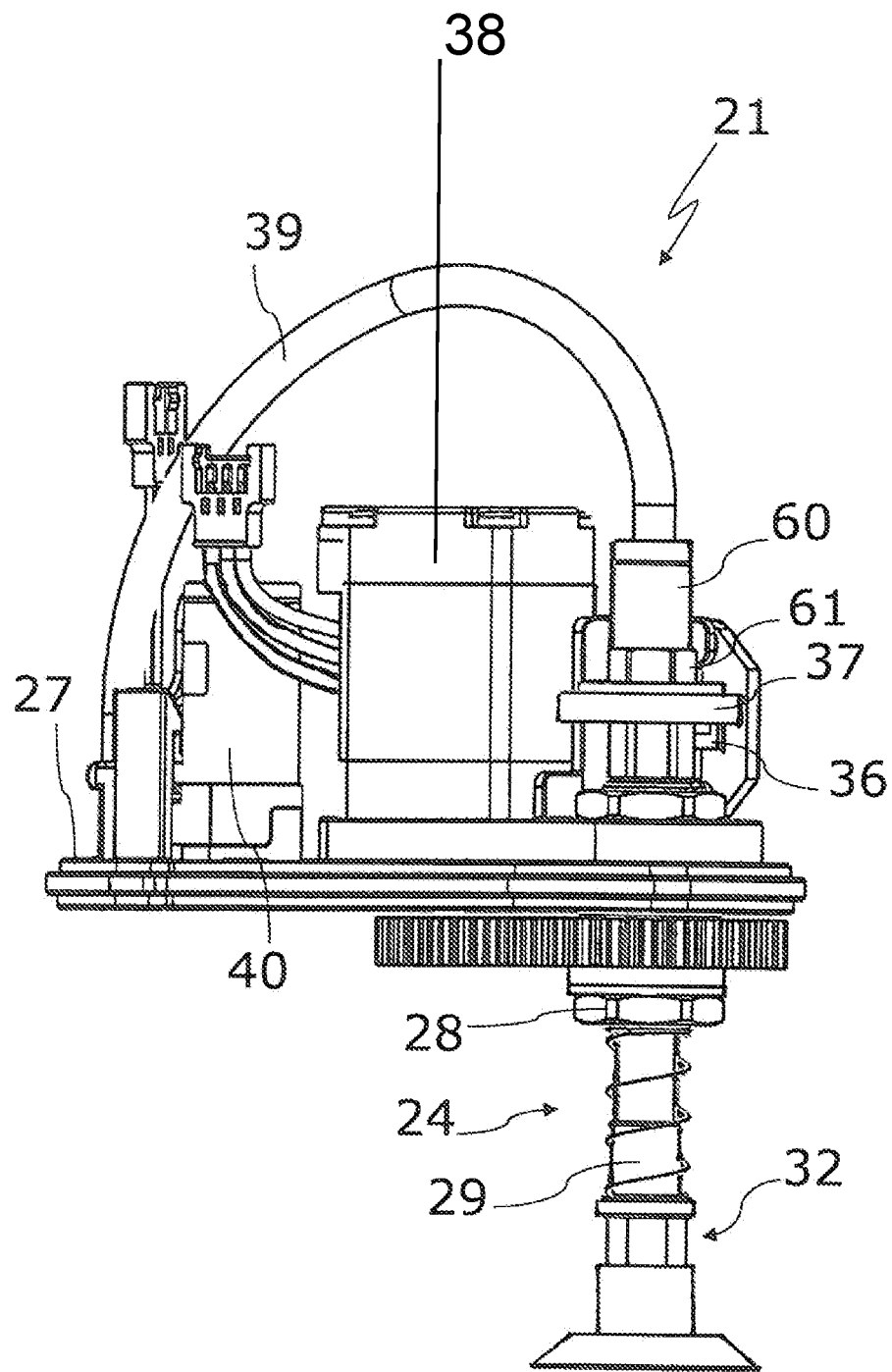
FIG. 3*b* is a second side view of the pickup device with the plunger in the extended position.

FIG. 3b shows a second, more detailed side view of pickup device 21 with plunger 24 in extended position 32. In particular, there is illustrated an air hose 39 which provides a connection between a vacuum pump 40 disposed on base plate 27 and plunger 24. Air is withdrawn from plunger 24 through air hose 39 to produce a negative pressure in plunger 24 in order to suck the label against it. A Hall-effect sensor 36 is located on fixed portion 28 of plunger 24 to measure a change in a magnetic field of a permanent magnet 37 on movable portion 29 of plunger 24 (see FIG. 4c) and to thereby measure a movement of movable portion 29 of plunger 24. Hall-effect sensor 36 is connected to control unit 35 (see FIG. 2) to indicate displacement of movable portion 29 of plunger 24. Air hose 39 is connected to the plunger via a coupling 60. A nut 61 is used to retain coupling 60 in its position.

Figure 3C:
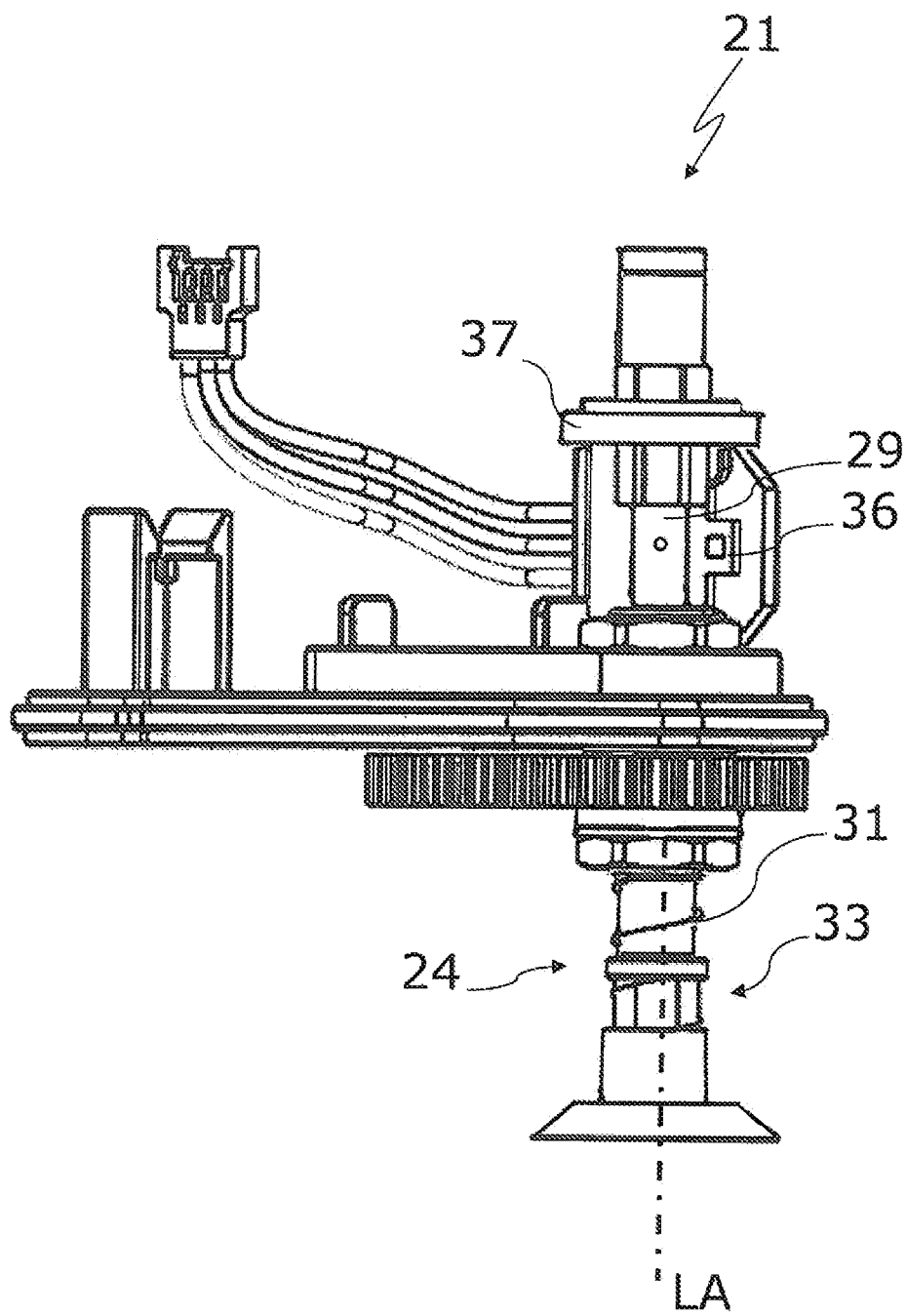
FIG. 3*c* is a side view of the pickup device of the labeling device with the plunger in the retracted position.

FIG. 3c shows a side view of pickup device 21 with plunger 24 in retracted position 33. In retracted position 33, spring element 31 is loaded. Permanent magnet 37 is spaced apart from Hall-effect sensor 36 in the axial direction along longitudinal axis LA of plunger 24.

Figure 4A:
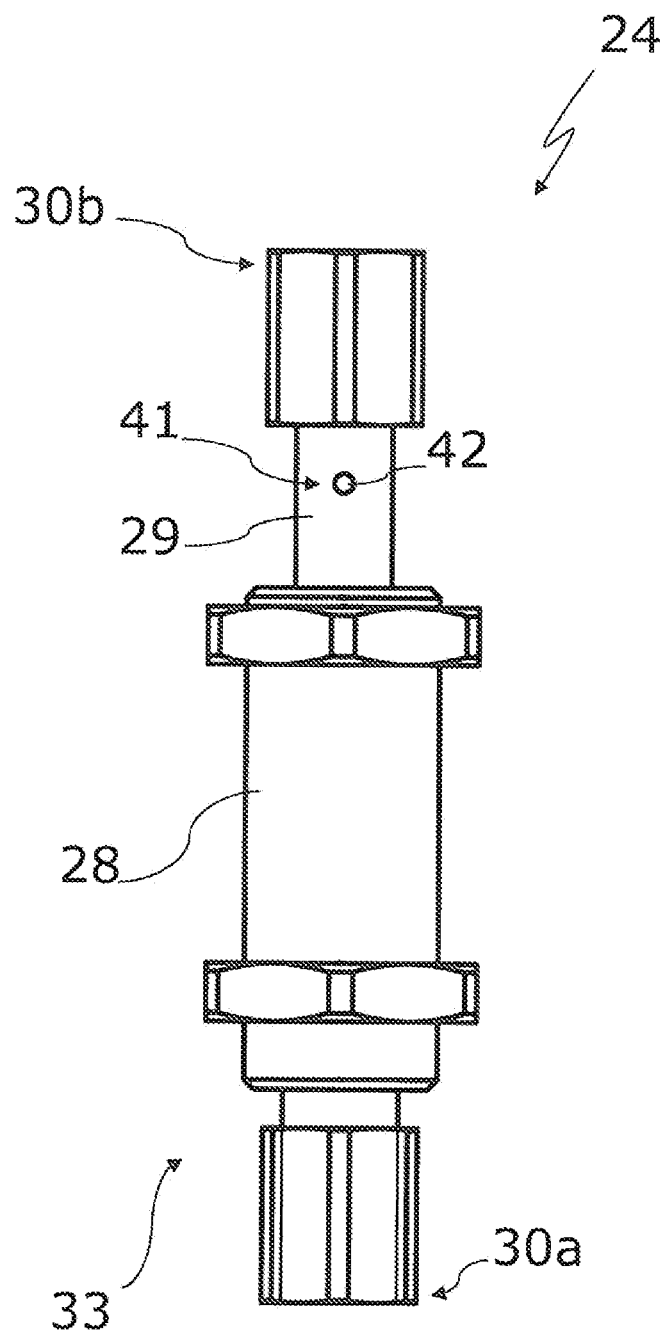
FIG. 4*a* is a side view of the plunger in the retracted position.

FIG. 4a shows a side view of plunger 24 where portion 29 of plunger 24, which is movable in fixed portion 28 of plunger 24, is in retracted position 33.

Figure 4B:
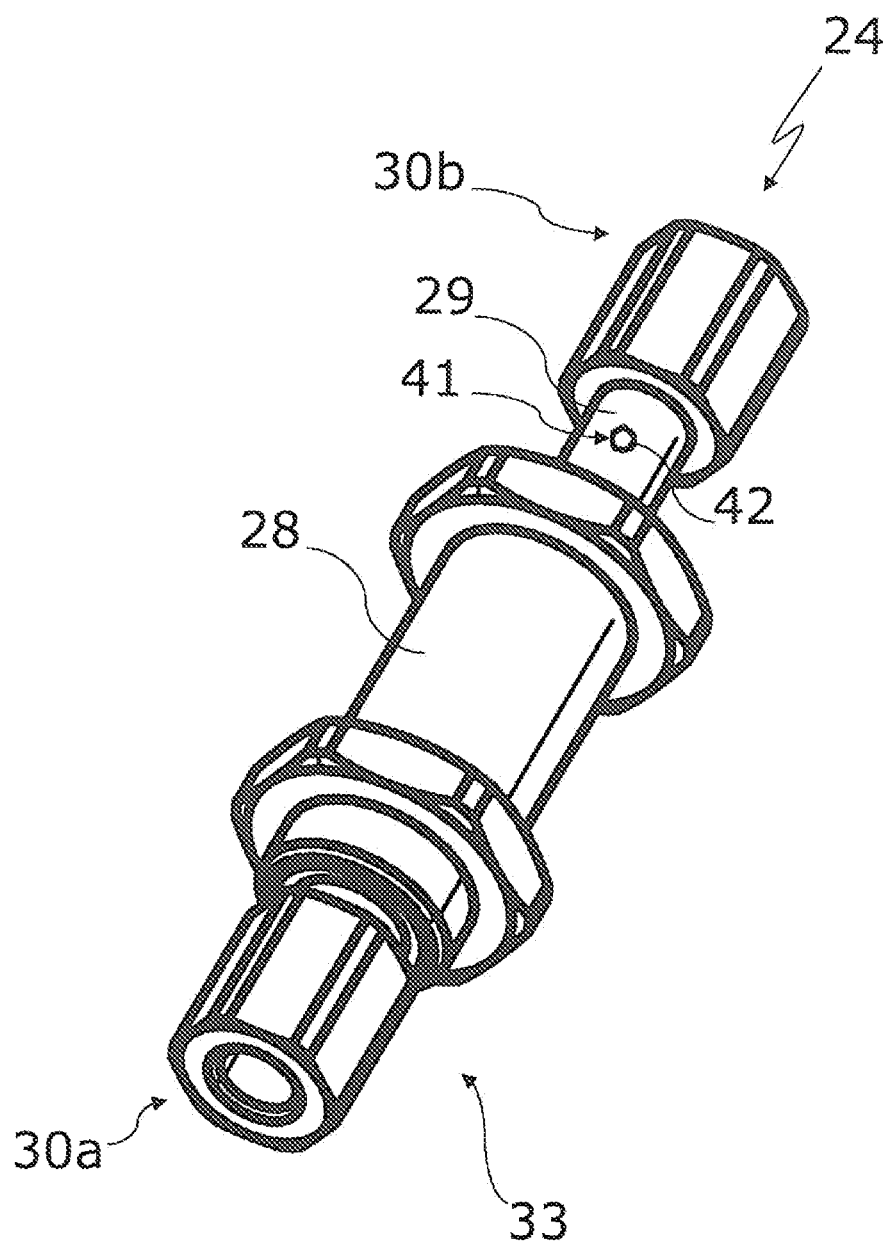
FIG. 4*b* is an isometric view of the plunger in the retracted position.

FIG. 4b shows a corresponding isometric view of plunger 24 in retracted position 33. Movable portion 29 and fixed portion 28 of plunger 24 are formed cylindrically as a tube. Plunger 24 has a mechanical pressure regulator 41 for breaking a negative pressure in plunger 24, which negative pressure is used to pick up the label. Mechanical pressure regulator 41 includes in particular an opening 42 in movable portion 29 of plunger 24. Opening 42 is formed closer to a rear end 30b of movable portion 29 of plunger 24 opposite its front end 30a than it is to its front end 30a. When movable portion 29 of plunger 24 is in retracted position 33 as shown, opening 42 is not covered by fixed portion 28 of plunger 24.

Figure 4C:
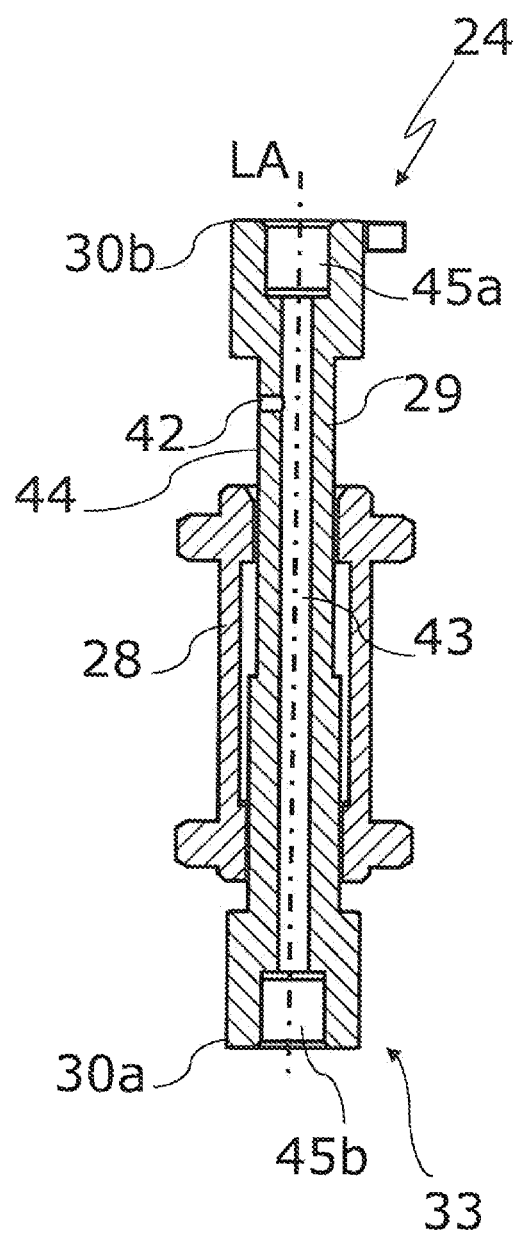
FIG. 4*c* is a cross section through the plunger.

FIG. 4c shows a cross section through plunger 24 with opening 42 in movable portion 29, which is axially movably supported in fixed portion 28 of plunger 24. Movable portion 29 is in retracted position 33. Movable portion 29 of plunger 24 has a cavity 43 extending along longitudinal axis LA of plunger 24 from rear end 30b of movable portion 29 of plunger 24 to front end 30a of plunger 24. Opening 24 extends from outer surface 44 of movable portion 29 to cavity 43. When, in the extended position 32 of movable portion 29 of plunger 24, opening 24 is covered by fixed portion 28 of plunger 24, a negative pressure can be produced in cavity 43 by withdrawing the air therefrom in order to suck a label onto front end 30a of plunger 24. Cavity 43 has a rear receptacle 45a at rear end 30b for air hose 39 (see FIG. 3b) and a front receptacle 45b at front end 30a for the suction head 46 (see FIG. 2) used to suck the label against it. Mounted to the rear end 30b of movable portion 29 of plunger 24 is a permanent magnet 37, whose magnetic field is measured by a Hall-effect sensor 36 (see FIG. 3a). Permanent magnet 37 is ring-shaped, so that it is aligned with Hall-effect sensor 36 in any angular position.

Figure 4D:
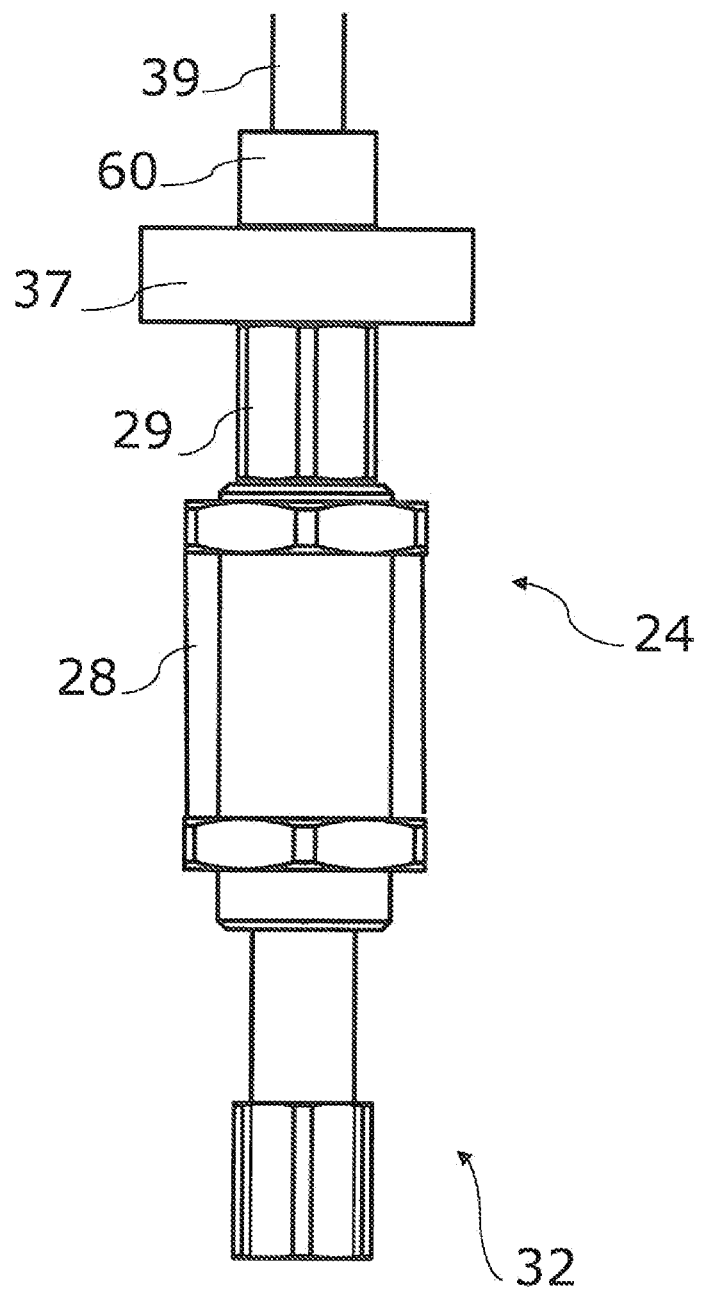
FIG. 4*d* is a side view showing the plunger in the extended position.

FIG. 4d shows a side view of plunger 24 in extended position 32. When movable portion 29 of plunger 24 is in extended position 32, opening 42 (see FIG. 4a) in movable portion 29 of plunger 24 is covered in a gas-tight manner by fixed portion 28 of plunger 24 to enable picking up of the label. This allows a negative pressure to be produced in plunger 24.

Figure 5A:
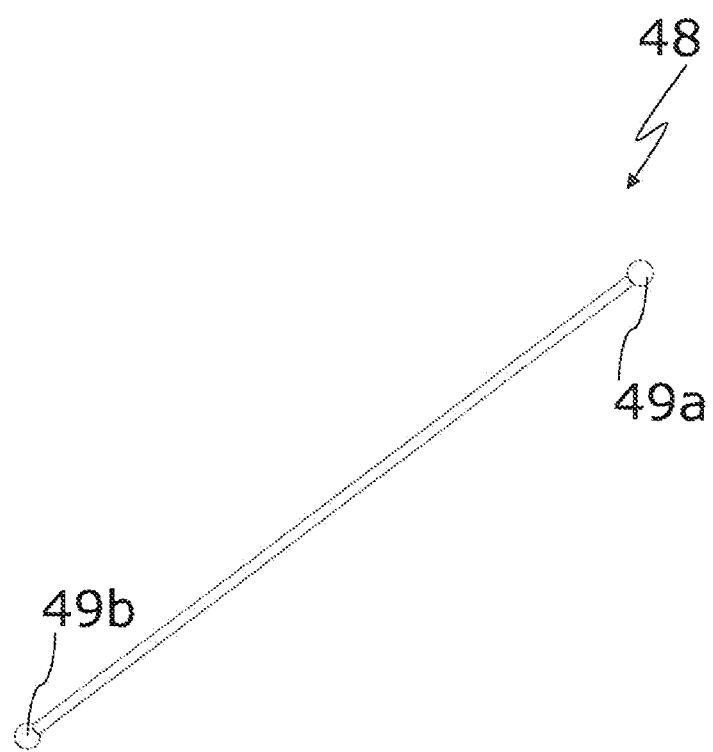
FIG. 5*a* is an isometric view of a tension cord of a retraction device of the labeling device according to the invention.

FIG. 5a shows an isometric view of an elastic tension cord 48 of return element 26 (see FIG. 2) or of the retraction device, the tension cord being made in particular of rubber or latex. Tension cord 48 or the tension belt is provided at both ends with spherical cord holders 49a, 49b by which tension cord 48 is attached to pickup device 21 and to robot base 19 (see FIG. 2).

Figure 5B:
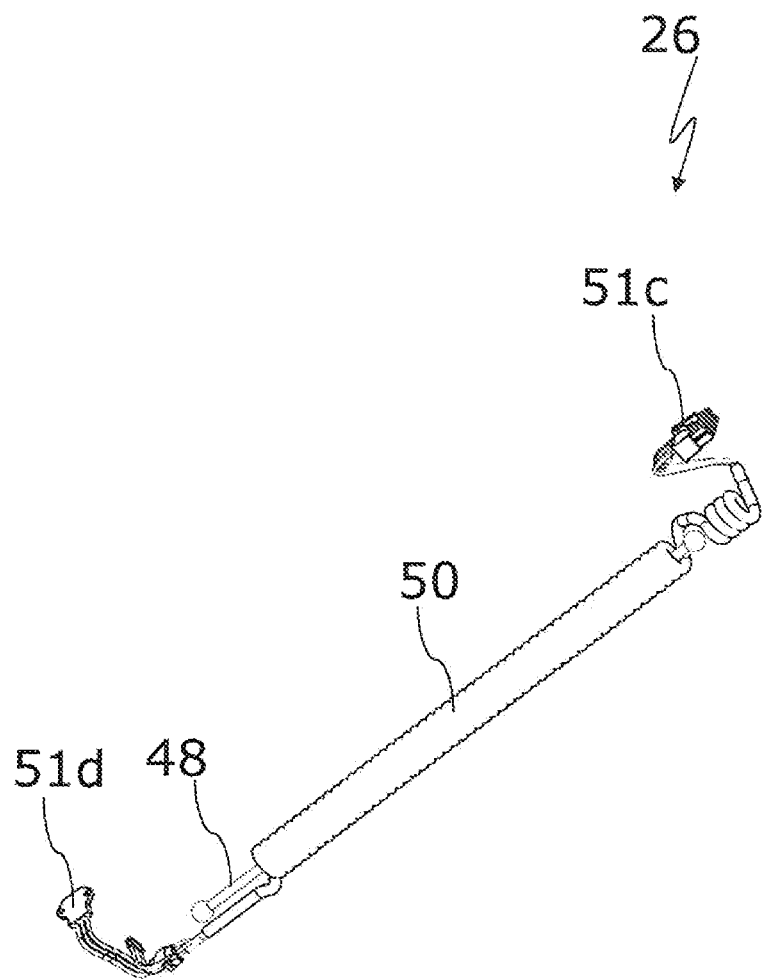
FIG. 5*b* is an isometric view showing the tension cord with a power cable.

FIG. 5b shows an isometric view of return element 26 with tension cord 48 and with a power cable 50 wound around tension cord 48, in particular in a helical path. Power cable 50 supplies data and power to pickup device 21 (see FIG. 1) via connections 51c, 51d.

Figure 5C:
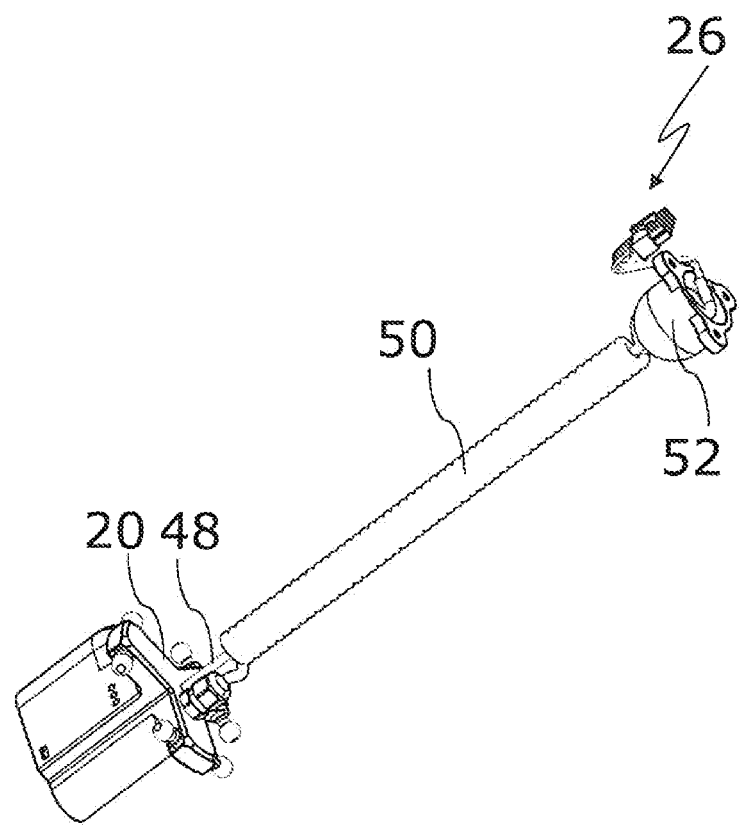
FIG. 5*c* is an isometric view of a retraction device of the labeling device.

FIG. 5c shows an isometric view of return element 26 with tension cord 48 and power cable 50. Tension cord 48 is attached to platform 20 of pickup device 21 (see FIG. 2) and to a fastening element 52 of robot base 19 (see FIG. 2).

Figure 6A:
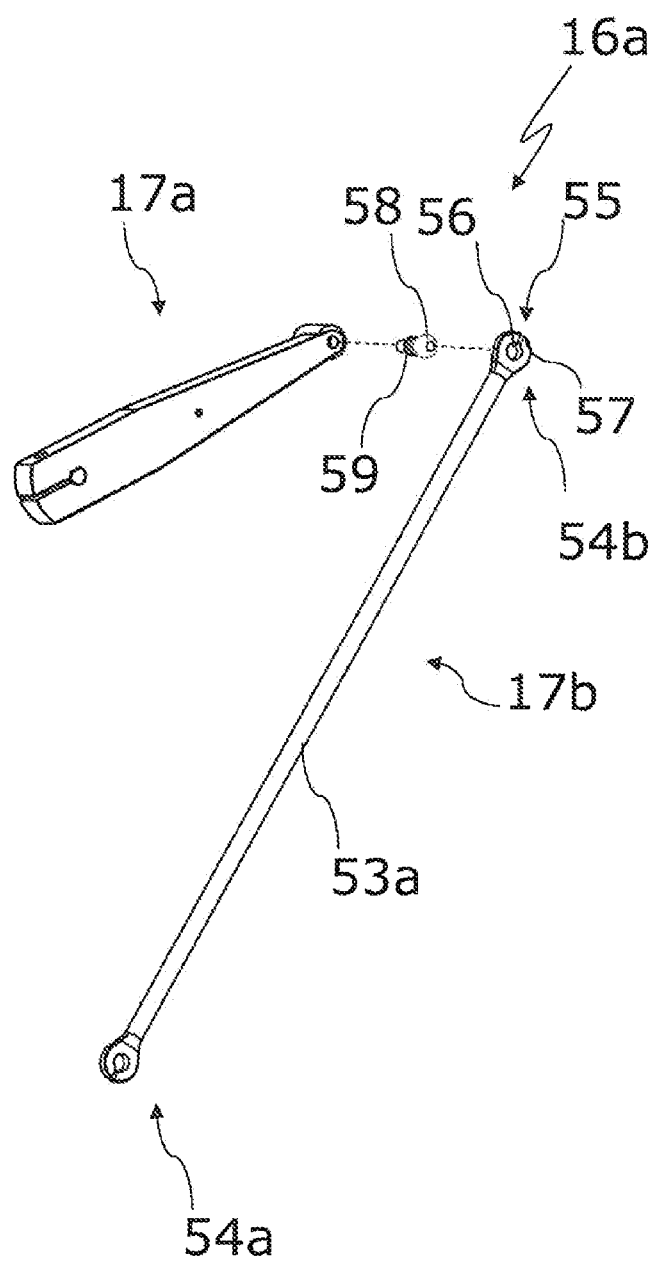
FIG. 6*a* is an exploded view of an articulated arm of the labeling device.

FIG. 6a shows an exploded view of one of articulated arms 16a-16c of labeling device 11 (see FIG. 2), here, by way of example, articulated arm 16a with first and second arm sections 17a, 17b. Rod 53a is shown here by way of example for the two parallelly guided rods 53a, 53b of second arm section 17b. Second arm section 17b of articulated arm 16a has a first and/or a second end 54a, 54b, each having a lug 55. Lug 55 has a circular through-receptacle 56 with an outwardly directed slot 57 for holding a spherical screw head 58. Screw 59 with screw head 58 is threaded into first arm section 17a in order to pivotably articulate first and second arm sections 17a, 17b together.

Figure 6B:
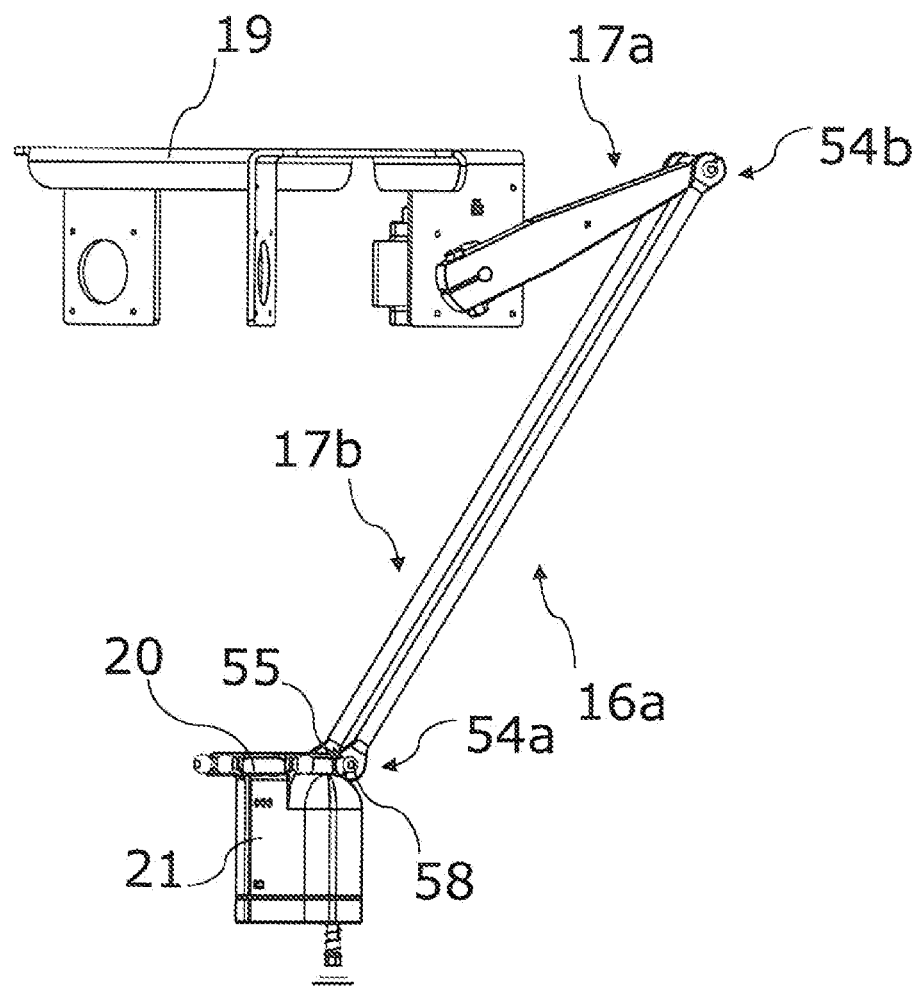
FIG. 6*b* is a view showing the articulated arm connected to a robot base and to the pickup device.

Finally, FIG. 6b shows the articulated arm 16a connected to a robot base 19 and to pickup device 21. Spherical screw heads 58 are inserted in lugs 55 at the ends 54a, 54b of second arm section 17b. Screws 59 (see FIG. 6a) with screw heads 58 are threaded in platform 20 of pickup device 21 and in first arm section 17a to connect pickup device 21 to second arm section 17b. Lugs 55 embrace the spherical screw heads 58 frictionally, and possibly also with a form fit. The through-holes of lugs 55 are formed by an inner radius of the lug, which has a reciprocal spherical geometry.

When inserting a spherical screw head, the lug is forced apart, whereupon it clamps the screw head therein so that it cannot slide out sideways from the lug.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 10 stretch film packaging machine
11 labeling device
12 article
13a,b printer
14 robot
15 dispensing device
16a-c articulated arms
17a,b arm sections
18a,b ends of the articulated arms
19 robot base
20 platform
21 pickup device
22a-c motor
23 weighing device
24 plunger
25 protective housing
26 return element
27 base plate
28 fixed portion of the plunger
29 movable portion of the plunger
30a,b ends of the movable portion of the plunger
31 spring element
32 extended position of the plunger
33 retracted position of the plunger
34 power cable
35 control unit
36 Hall-effect sensor
37 permanent magnet
38 rotary motor
39 air hose
40 vacuum pump
41 mechanical pressure regulator
42 opening
43 cavity
44 outer surface
45a,b receptacles
46 suction head
48 elastic tension cord
49a,b spherical cord holders
50 power cable
51a,b connections
52 fastening element
53a,b parallelly guided rods
54a,b ends of the second section of the articulated arm
55 lug
56 circular through-receptacle
57 slot
58 screw head
59 screw
60 air hose coupling
61 nut
LA longitudinal axis/longitudinal direction of the plunger

The invention claimed is:

1. A labeling device for a stretch film packaging machine, the labeling device comprising:
a pickup device moveable to pick up a label, the pickup device including a platform, a base plate and a plunger configured to pickup the label;
a delta robot comprising at least two articulated arms and a robot base, each of the articulated arms comprising a first arm section and a second arm section, which are articulated to one another, the articulated arms each being articulated at a first end to a robot base and at a second end to the platform, and the articulated arms each being pivotable about a respective axis of rotation at the robot base and configured to be driven by a respective motor fixedly mounted to the robot base; and
wherein each of the second arm sections of the articulated arms has a first end or a second end with a lug having a circular, outwardly slotted through-receptacle configured to hold a spherical screw head, and
wherein the respective second arm section of the articulated arms is formed as a carbon rod.

2. The labeling device as recited in claim 1, wherein the second arm section connects the first arm section to the pickup device.

3. The labeling device as recited in claim 1, wherein the through-receptacle of each lug is formed by an inner radius of the lug, having a reciprocal spherical geometry suitable for receiving the respective spherical screw head.

4. The labeling device as recited in claim 1, wherein spherical screw heads are inserted in the lugs at the first end or the second end of each of the second arm sections for connecting the first arm section and the second arm section to one another or for connecting the second arm section to the platform, the respective lug frictionally embracing the spherical screw head.

5. The labelling device according to claim 1, wherein the ends of the second arm section of the articulated arms are at least partially made of plastic material with having slip properties.

6. The labelling device according to claim 5, wherein the plastic material is made of a base polymer with fibers and fillers and using a solid lubricant.

7. The labeling device as recited in claim 1, wherein the plunger comprises a fixed portion that is mounted to the base plate and is not displaceable relative to the base plate in a longitudinal direction of the plunger, and a moveable portion that is movable in the fixed portion in the longitudinal direction of the plunger the moveable portion having a front end configured to pick up a label.

8. The labeling device as recited in claim 7, wherein the pickup device includes a suction head mounted to the front end of the movable portion and connected via the plunger to a vacuum pump.

9. The labeling device as recited in claim 8, wherein the movable portion or the fixed portion of the plunger is tubular.

10. The labeling device as recited in claim 8, wherein in an unloaded condition, the movable portion of the plunger is retained in the extended position by a spring.

11. The labeling device as recited in claim 8, wherein the movable portion or the fixed portion of the plunger is mounted so as to be rotatable relative to the base plate about the longitudinal axis of the plunger.

12. The labeling device as recited in claim 8, wherein a permanent magnet is mounted to the rear end of the movable portion of the plunger opposite the front end of the movable portion of the plunger,
wherein the pickup device comprises a Hall-effect sensor for measuring the magnetic field of the permanent magnet, and
wherein the Hall-effect sensor is connected to a controller configured to indicate displacement of the movable portion of the plunger.

13. The labeling device as recited in claim 12, wherein the Hall-effect sensor and the permanent magnet are located at a same height relative to the base plate when the movable portion of the plunger is in the extended position.

14. The labeling device as recited in claim 8, further comprising a return element connecting the robot base to the platform and configured to mechanically return the pickup device against gravity to a home position in an idle state of the robot.

15. The labeling device as recited in claim 14, wherein the return element includes an elastic tension cord.

16. The labeling device as recited in claim 15, further comprising a power cable for supplying power to the pickup device disposed on and carried by the tension cord.

17. The labeling device according to claim 8, wherein a mechanical pressure regulator comprises an opening in the movable portion of the plunger.

18. The labeling device according to claim 17, wherein the movable portion of the plunger is configured to be displaced in longitudinal direction due to contact with a stretch film packaging such that the plunger is placed in the retraction position, uncovering the opening and breaking the negative pressure such that the label is released from the plunger.

19. The labeling device according to claim 1, wherein the slotted through-receptacle is configured to hold the spherical screw head in a manner so as to non-destructively detach from the spherical screw in the event of a malfunction.

20. A labeling device for a stretch film packaging machine, the labeling device comprising:
a pickup device moveable to pick up a label, the pickup device including a platform, a base plate and a plunger configured to pickup the label;
a delta robot comprising at least two articulated arms and a robot base, each of the articulated arms comprising a first arm section and a second arm section, which are articulated to one another, the articulated arms each being articulated at a first end to a robot base and at a second end to the platform, and the articulated arms each being pivotable about a respective axis of rotation at the robot base and configured to be driven by a respective motor fixedly mounted to the robot base; and
wherein each of the second arm sections of the articulated arms has a first end or a second end with a lug having a circular, outwardly slotted through-receptacle configured to hold a spherical screw head,
wherein the ends of the second arm section of the articulated arms are at least partially made of plastic material with having slip properties, and
wherein the plastic material is made of a base polymer with fibers and fillers and using a solid lubricant.

* * * * *